(12) United States Patent
Bamberger et al.

(10) Patent No.: US 8,102,314 B2
(45) Date of Patent: Jan. 24, 2012

(54) METHOD AND APPARATUS FOR DETERMINING THE LOCATION OF A MOBILE OBJECT

(75) Inventors: Joachim Bamberger, Stockdorf (DE); Bruno Betoni Parodi, München (DE); Joachim Horn, Hamburg (DE); Henning Lenz, Karlsruhe (DE); Andrei Szabo, Riemerling (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 281 days.

(21) Appl. No.: 11/991,588

(22) PCT Filed: Dec. 12, 2006

(86) PCT No.: PCT/EP2006/069616
§ 371 (c)(1), (2), (4) Date: Dec. 7, 2009

(87) PCT Pub. No.: WO2007/118518
PCT Pub. Date: Oct. 25, 2007

(65) Prior Publication Data
US 2010/0103048 A1    Apr. 29, 2010

(30) Foreign Application Priority Data

Mar. 31, 2006  (EP) ................................. 06006833
Sep. 20, 2006  (DE) ..................... 10 2006 044 293

(51) Int. Cl.
*G01S 3/02*    (2006.01)
(52) U.S. Cl. ........................................... 342/451
(58) Field of Classification Search ............. 342/451
See application file for complete search history.

(56) References Cited

U.S. PATENT DOCUMENTS

| | | | |
|---|---|---|---|
| 6,259,406 B1 | 7/2001 | Sugiura et al. | |
| 6,799,047 B1* | 9/2004 | Bahl et al. | 455/456.1 |
| 6,832,090 B2* | 12/2004 | Riley et al. | 455/446 |
| 6,839,560 B1* | 1/2005 | Bahl et al. | 455/456.1 |
| 7,020,475 B2* | 3/2006 | Bahl et al. | 455/456.1 |
| 7,203,489 B2* | 4/2007 | Saunders | 455/423 |
| 7,298,327 B2* | 11/2007 | Dupray et al. | 342/451 |
| 2005/0208952 A1 | 9/2005 | Dietrivch et al. | |
| 2005/0243936 A1* | 11/2005 | Agrawala et al. | 375/259 |
| 2006/0087425 A1* | 4/2006 | Haeberlen et al. | 340/539.13 |

OTHER PUBLICATIONS

T. S. Rappaport, "Wireless Communications Principles und Practice", 2nd Ed., 2002 pp. 105-167 Prentice Hall Inc.

(Continued)

*Primary Examiner* — Thomas Tarcza
*Assistant Examiner* — Frank McGue

(57) ABSTRACT

The invention relates to a position-finding method for determining the location of a mobile object. The features, for example received field strengths, of a plurality of base stations are measured, and the object position is located from these features, using a reference map. During an initialization process, a reference map is created which comprises a multiplicity of positions and the associated feature-dependent values. During use of the method, a plurality of position-finding processes are carried out, by means of each of which a measured feature-dependent value and from this, a located position of the object, are determined using the predetermined reference map. The predetermined reference map is in each case updated for at least some of the positions found, during which updates, the feature-dependent values are each corrected by a correction term at the support points of the reference map in a predetermined area surrounding an object position.

20 Claims, 9 Drawing Sheets

OTHER PUBLICATIONS

T. Kohonen, "The Self-Organizing Map", Proceedings of the IEEE, Sep. 1990, pp. 1464-1480, vol. 78, No. 9.

M. Schlang, M. Haft und K. A. Fuchs, "A comparison of RBF and MLP networks for reconstruction of focal events from bioelectric/biomagnetic field patterns," in Mustererkennung 1994 Erkennen und Lernen, 16. DAGM Symposium und 18. Workshop of the ÖAGM, 1994 pp. 265-272.

Gerd Wölfe, René Wahl, Philipp Wertz, Pascal Wildbolz, Friedrich Landstorfer, "Dominant Path Prediction Model for Indoor Scenarios", German Microwave Conference, Apr. 5-7, 2005, pp. 1-4.

G. Wölfle, F.M. Landstorfer, "Dominant Paths for the Field Strength Prediction", Vehicular Technoloy COnfernce, 1998, VTC 98, 48th IEEE Ottawa, Ont., Canada, May 1998, pp. 552-556, vol. 1, New York, NY, USA, IEEE, , XP010287853, ISBN: 0-7803-4320-4.

H. Wang, "Fusion of Information Sources for Indoor Positioning with Field Strength Measurements", Master Thesis, Munich University of Technology, 2005, pp. i-vii, 1-74.

M. Shimrat, "Algorithm 112: position of point rela-tive to polygon," Communications of the ACM, Aug. 1962, pp. 434, vol. 5, No. 8.

Robert W. Floyd, "Algorithm 97: shortest path," Communications of the ACM, 1962, pp. 345, vol. 5, No. 6.

* cited by examiner

METHOD AND APPARATUS FOR DETERMINING THE LOCATION OF A MOBILE OBJECT

CROSS REFERENCE TO RELATED APPLICATIONS

This application is the US National Stage of International Application No. PCT/EP2006/069616, filed Dec. 12, 2006 and claims the benefit thereof. The International Application claims the benefits of German application No. 10 2006 044 293.8 filed Sep. 20, 2006 and European application No. 06006833.5 filed Mar. 31, 2006. All of the applications are incorporated by reference herein in their entirety.

FIELD OF INVENTION

The invention relates to a method and an apparatus for the computer-aided localization of a mobile object.

BACKGROUND OF THE INVENTION

Various feature-based methods for finding the position of mobile users or terminal devices in wireless communication networks are known from the prior art. As features, for example, the field strengths of fields through the mobile object are measured, the fields being generated and emitted in the communication network by a plurality of base stations. As communication networks, for example, DECT networks (DECT=Digital Enhanced Cordless Telecommunications), WLAN networks (WLAN=Wireless Local Area Network) and the mobile radiocommunication networks GSM (GSM=Global System for Mobile Communication) and UMTS (UMTS=Universal Mobile Telecommunication System) are used.

In feature-based position finding, so-called reference maps are used in which, for a multiplicity of support points, a relationship between the spatial position of the support point and feature-dependent variables of the individual base stations is filed. Feature-dependent variables in a field-strength-based method are, for example, the field strength of the field emitted by a base station at the spatial position of the support point or the field strength, measured at the base station, of a field that is emitted by an object which is located at the spatial position of the support point. By measuring the field strength at any position and by comparing the measured value with the field-strength-dependent variables at the support points on the reference map, the position of the object can be determined. In the field-strength-based method known from the prior art, a calibration or gauging of reference patterns is necessary in order to achieve sufficient accuracy in structured environments. This calibration is labor- and cost-intensive, and the greater the accuracy desired, the more time-consuming it is.

Besides calibration using reference patterns, it is also known from the prior art for the position of the most powerfully receiving base station to be determined in the mobile object by means of simple trilateration models, for example assuming a radial field propagation. In such methods, few parameters are needed, and these can be adjusted by means of few reference measurements. However, these methods have the disadvantage that the accuracy they achieve is significantly lower than in methods in which a reference map is created by means of a multiplicity of measurements.

SUMMARY OF INVENTION

The object of the invention is to create a simple localization method which has high accuracy and can be installed with little outlay and without carrying out a multiplicity of reference measurements.

This object is achieved by the independent claims. Further developments of the invention are defined in the dependent claims.

In the method according to the invention, the features of a plurality of base stations are measured with the aid of a feature-based position-finding method and the position of the object located from these features, using a reference map. Here, the feature of a base station is a feature which is associated with a field, the field being a field emitted by the base station at the position of the object or a field emitted by the object at the base station. A relationship is thus created by the field between a single base station and the position of the object in space. Here, the method is initialized in a first step by means of a reference map which comprises a multiplicity of support points, a support point being in each case represented by a position and a feature-dependent value assigned to the position. A feature-dependent value is understood below to mean a value which depends on the previously described features of the base stations. In particular, the feature-dependent value can be a feature vector which comprises the features of all the base stations. In a field-strength-based method, the feature-dependent value is, for example, a field-strength-dependent value. In particular, the value in such a method can be a field-strength vector which comprises as entries the field strengths of each base station. Here, the field strengths of the base stations can be the field strengths of fields emitted by the base stations at the object position. They can, however, also be the field strengths of fields emitted by the object at the location of the individual base stations. The method according to the invention is not restricted to the use of field-strength-based position-finding methods; in particular, runtime-based or angle-based position-finding methods can also be used as position-finding methods. In the case of runtime-based position-finding methods, the position of an object is determined via the runtime of a field. In the case of angle-based position-finding methods, the position of an object is determined via the spatial angles at which a field strikes an object or a base station.

After initialization, during operation a plurality of position-finding processes are carried out, by means of each of which a measured feature-dependent value and, from this, a located position of the object are determined via the feature-based position-finding method, using the predetermined reference map. One or more updates of the predetermined reference map is/are carried out in each case for at least some of the locations, during which updates the feature-dependent values are corrected by a correction term at the support points on the reference map in a predetermined area surrounding an object position, the correction term depending on the difference between the measured feature-dependent value of the respective location and the feature-dependent value at a support point in the predetermined surrounding area. Here, the predetermined surrounding area can be chosen arbitrarily according to requirements and can, in particular, also cover the entire area of the reference map.

Here, the object position about which the predetermined surrounding area is disposed can, for example, be a position known in advance, i.e. it is known in the method at what point the object is located when a corresponding position-finding process is carried out. In this case, the method according to the invention serves in calibrating a reference map in a highly accurate manner without the method being used for locating unknown positions. The object position can, however, also be an unknown position which is the located position determined by means of the respective position-finding process. In this case, during implementation of the method, a position-finding process and a calibration, and thus improvement of the position-finding accuracy, are carried out simultaneously. Here, the updating of the reference map in accordance with the inventive method can always be carried out at the time of the respective position-finding process, but there is also the possibility for the step not to be carried out until a predetermined number of position-finding processes have been completed, all object positions up until the preceding position-finding process then preferably being corrected by a correction term.

The reference map that is predetermined during initialization of the method can, for example, be computed by means of a wave propagation model. As the wave propagation model, a radial propagation model, an MWM propagation model (MWM=Multi Wall Model) or a DPM propagation model (DPM=Dominant Path Model) can, for example, be used. These propagation models will be explained in greater detail in the detailed description. Through the use of such wave propagation models, a reference map can be predetermined easily and rapidly during initialization of the method without time-consuming reference measurements having to be carried out at a multiplicity of positions. It suffices in particular for the parameters of the propagation model to be determined by a simple self-measurement by the base stations.

In a preferred embodiment, each of the plurality of position-finding processes is carried out with the aid of a fingerprinting method. The fingerprinting method is adequately known from the prior art and will be explained in greater detail in the detailed description. Optionally, however, other methods can also be used for position finding, for example methods which use a probabilistic cost function based on the differences determined for the correction term in order to determine by this means the located position.

In a particularly preferred embodiment of the invention, the size of the correction term decreases in magnitude with increasing distance from the object position, thereby taking account of the fact that the error according to the correction term has only a local influence on the feature-dependent value.

In a particularly preferred embodiment of the invention, the correction term depends on a Gaussian function with its center in the object position. Furthermore, the predetermined area surrounding the object position also depends on a parameter of the Gaussian function, namely on the standard deviation of the Gaussian function. Here, the predetermined surrounding area is preferably given by a circle about the center of the Gaussian function having a radius which is greater than or equal to the standard deviation and in particular a multiple of, preferably three times, the standard deviation. The values of the Gaussian function outside this circle are so small that they can be ignored. By virtue of the fact that only certain support points in the area surrounding the object position are taken into account, the method requires less computing time.

Preferably, the standard deviation of the Gaussian function is chosen such that it depends on the spacing of the support points on the reference map and lies in particular between the support-point spacing and five times the support-point spacing. In order to reduce the computing time of the method, the Gaussian function is approximated in a further preferred variant of the invention by a function which decreases to zero with increasing distance from the center and, in particular, is zero at a value greater than or equal to the standard deviation, preferably at three times the standard deviation. Such a function is cited for example in the detailed description in equation (10).

In a particularly preferred embodiment of the invention, the measured feature-dependent value is a feature vector, in particular a field-strength vector, measured at the object or at the base stations at the time of the position-finding process, and the predetermined reference map is a location feature map in which the feature-dependent values are feature vectors for the positions of the support points, a feature vector comprising as entries the features of the base stations for the corresponding position. Optionally, the feature-dependent value can also be a distance such that the reference map represents a location distance map. Here, a wave propagation model, for example, is used in order to infer from field-strength values dominant distances, which are filed in the location distance map. In this case, the position-finding can be carried out via a trilateration calculation or, where there are more than three base stations, a multilateration calculation.

In a particularly preferred embodiment of the invention, the correction term $S_{UPD}$ for a support point k inside the predetermined surrounding area is given by or depends on the following function:

$$S_{UPD} = {}^k\Delta p \cdot f(r)$$

where f(r) is a Gaussian function defined as follows:

$$f(r) = \kappa \cdot e^{-\frac{1}{2}(\frac{r}{\sigma})^2},$$

where σ is the standard deviation and r the distance from the object position and κ is preferably a value less than 1 and particularly preferably less than or equal to 0.5, where ${}^k\Delta p$ is a differential feature vector with one entry in each case for the feature of a base station of N base stations, where the differential feature vector ${}^k\Delta p$ is either defined as:

$$^k\Delta p = {}^c p - {}^c p_{RM},$$

where ${}^c p$ is the measured feature vector at the time of the position-finding process and ${}^c p_{RM}$ is a feature vector determined at the located position by means of the location feature map (RM), or is defined as:

$$^k\Delta p = {}^c p - {}^k p_{RM},$$

where ${}^c p$ is the measured feature vector at the time of the position-finding process and ${}^k p_{RM}$ is the feature vector at the support point k of the location feature map.

According to the cited alternatives for calculating ${}^k\Delta p$, either a vector is used as a value for ${}^k\Delta p$ that is independent of the support point which is corrected, or a value is used in which the value of the feature at the support point under consideration has an influence in accordance with the location feature map. The variant of the method just defined is used for example for carrying out so-called unsupervised learning, in which the position at which the object is located is not known at the time of the respective position-finding process. This means that the position of the object located by means of the respective position position-finding process is used as the object position. However, it is also possible for the path of the mobile object to be predetermined and the object position to be known in advance at the time of the respective position-finding process. Preferably, the object moves on one or more predetermined path sections between, in each case, two base stations, object positions being known in advance on the respective path section Q and a position-finding process being carried out at each of these object positions. Preferably, the correction term $S_{UPD}(r, q)$ at object position q (q=1, ..., Q) of Q object positions on a path section is defined as follows:

$$S_{UPD}(r, q) = \kappa^q \Delta p \frac{e^{-\frac{1}{2}\left(\frac{q_r}{\sigma}\right)^2}}{\sum_{g=1}^{Q} e^{-\frac{1}{2}\left(\frac{g_r}{\sigma}\right)^2} + \zeta}$$

where $\sigma$ is the standard deviation and $^q r$ the distance from the object position q and $^g r$ the distance from the object position g and where $\kappa$ is preferably a value less than or equal to 0.5, where $\zeta$ is a positive term which ensures that the denominator is not zero, where $\zeta$ is preferably less than 1 and in particular 0.3, where $^q \Delta p$ is a differential feature vector comprising one entry in each case for the feature of a base station of N base stations, where the differential field-strength vector $^q \Delta p$ is defined as:

$$^q \Delta p = {}^{cq}p - {}^{cq}p_{RM},$$

where $^{cq}p$ is the feature vector measured at the time of the position-finding process at the object position q and $^{cq}p_{RM}$ is a feature vector determined at the located position by means of the location feature map (RM).

According to this variant, the updating of the location feature map is always carried out after a predetermined path section has been executed, the sum total of all Gaussian functions at the positions on the path section being taken into account in the updating. This variant of the method is a supervised learning method as the object positions are known in advance during the learning method.

In a preferred variant of the method just cited, the spacing between consecutive object positions is constant and the standard deviation depends on this constant spacing and is in particular directly proportional to the constant spacing.

In a particularly preferred variant of the supervised learning method, the mobile object executes a sequence of predetermined path sections, the order of the path sections executed being suitably determined with the aid of a cost function. The cost function here preferably indicates for a respective path section how great the maximum distance of an object position on the path section is from the nearest base station or from a nearest object position which has already been traversed. By means of such a cost function, it is achieved that a large area of object positions is covered by the method as rapidly as possible.

In the method according to the invention, the feature-based position-finding method can comprise a field-strength-based and/or runtime-based and/or angle-based position-finding method. Preferably, the runtime-based position-finding method takes into account only such fields as exhibit a minimum signal strength at the object.

The feature-based position-finding method can use any fields, in particular fields of a DECT and/or WLAN and/or mobile radio network.

Besides the inventive method just described, the invention relates furthermore to an apparatus for the computer-aided position-finding of a mobile object with the aid of a feature-based position-finding method, by means of which the features of a plurality of base stations are measured and the position of the object is located from these features, using a reference map, the apparatus comprising: at least one antenna for receiving the fields of the base stations and/or for emitting fields for receiving by the base stations as well as an evaluation unit for evaluating the measured features of the base stations. The evaluation unit is configured such that the above-described method according to the invention can be carried out by means of it.

BRIEF DESCRIPTION OF THE DRAWINGS

Exemplary embodiments of the invention will be described in detail below with reference to the attached drawings, in which.

DETAILED DESCRIPTION OF INVENTION

Figure 1:
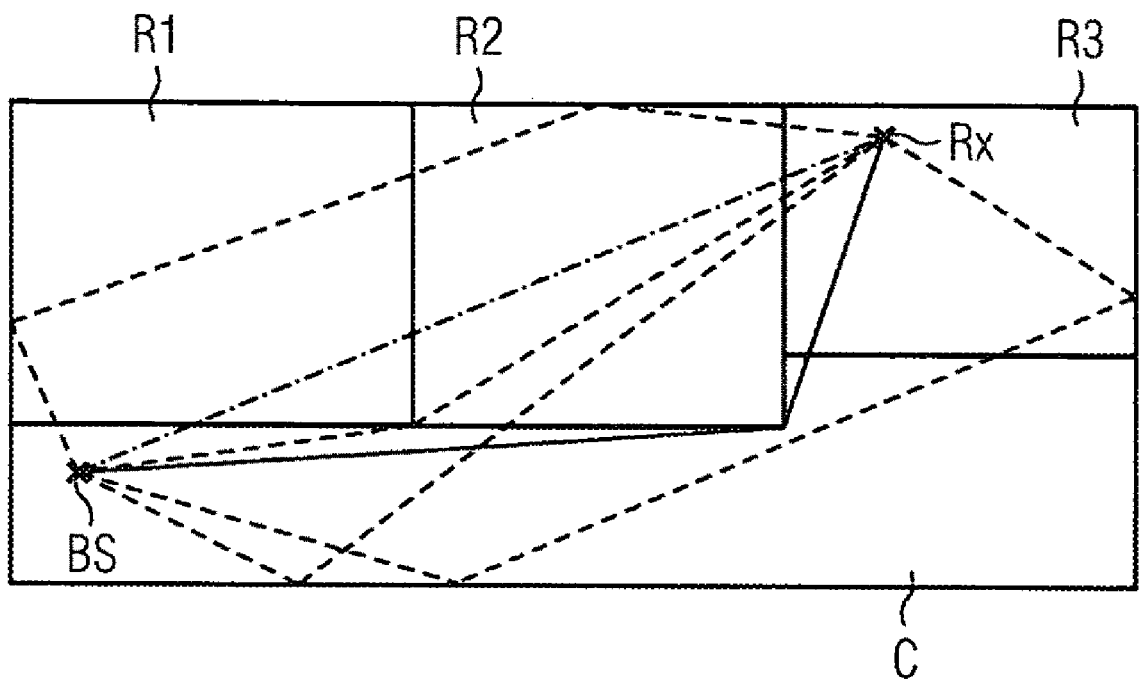
FIG. 1 shows a schematic representation of the propagation models which can be used according to the invention.

In the embodiments of the inventive method described below, a mobile object is considered which has at least one antenna, by means of which the field strengths of a plurality of base stations in the area surrounding the object can be received and measured. Here, each base station transmits wireless signals with a certain power (i.e. with a certain field-strength value). These wirelessly transmitted signals propagate in space, where they are reflected, bent and absorbed, notably by persons and other objects in the space, such as e.g. walls, machinery or office furniture, in the surrounding area.

In the exemplary embodiments of the inventive method described here, the propagation profile for each base station is described in the form of a two- or three-dimensional map, each position in the map being uniquely linked to a received field-strength value for each base station. The received field-strength value is also referred to below as the RSS value (RSS=received signal strength). Consequently, such a map links position coordinates to RSS values of base stations, and the use of such maps, which are also referred to as "radio maps" is known from the prior art. Such maps are referred to below as location field-strength maps (RM for short) and they correspond in the special variant of the inventive method described here to the reference maps defined in the claims. The map describes a surface in a continuous space and can either be a continuous representation of e.g. a set of functions or a discrete representation as a matrix of recorded values which were taken from the continuous map.

A location field-strength map is used below which constitutes a discrete representation of field-strength values at different positions or support points in the space.

The location field-strength map RM is defined for K support points, a set of all the support points $POS_{RM}$ in the space being defined by the following matrix:

$$POS_{RM} = [{}^1 pos_{RM} {}^2 pos_{RM} \ldots {}^K pos_{RM}]^T, \quad (1)$$

where each individual term $^k pos_{RM} = [^k x_{RM} {}^k y_{RM}]$ is the $k^{th}$ two-dimensional position of this set at support points.

A surrounding area comprising N base stations BS is considered below, it being possible for the location field-strength map RM to be represented as a set of K vectors of RSS values and for each of these vectors to have the dimension N for the field strengths of the N base stations. In this way, a matrix representation of the location field-strength map RM is produced, which reads as follows:

$$RM = \begin{bmatrix} {}^1p_{RM} \\ {}^2p_{RM} \\ \vdots \\ {}^Kp_{RM} \end{bmatrix} = \begin{bmatrix} {}^1p_{RM1} & {}^1p_{RM2} & \cdots & {}^1p_{RMN} \\ {}^2p_{RM1} & {}^2p_{RM2} & \cdots & {}^2p_{RMN} \\ \vdots & \vdots & \ddots & \vdots \\ {}^Kp_{RM1} & {}^Kp_{RM2} & \cdots & {}^Kp_{RMN} \end{bmatrix} \quad (2)$$

Here, the expression ${}^k p_{RM}$ is the $k^{th}$ vector of RSS values from the set of K support points and the expression ${}^k p_{RMn}$ is the field-strength value for the base station n of the vector ${}^k p_{RM}$.

Where there is a fixed number of support points, the support points must still be distributed suitably in the space. There is the possibility here of using a grid with an even spacing, the distance between the grid points being known. The positions of previously measured training data can also be used as the grid points.

In order with the aid of the above-defined location field-strength map now to locate the position from measured field-strength values at the object, a fingerprinting method (also referred to as "pattern matching") is used in the embodiment described here. This method is adequately known from the prior art and is therefore only outlined briefly below.

The location field-strength map describes the field strength as a function of the position, i.e. it maps the two- or three-dimensional position vectors into N-dimensional field-strength vectors. The converse problem, i.e. determining a position from the field-strength vector, is referred to as localization estimation or localization and constitutes the position-finding step as, for example, defined generally in step b) of claim 1.

Typically, there is no analytical description of the inverse function by means of which the location field-strength map was generated. The localization task can therefore be defined as follows:

Starting from a location field-strength map RM, which describes the field-strength distribution in a space for N base stations BS and for a predetermined measured field-strength vector $p_{means} = [p_{meas1} \, p_{meas2} \, \cdots \, p_{measN}]^T$, which was determined at an unknown position $pos_{meas} = [x_{meas} \, y_{meas}]$, the position ${}^k pos_{RM}$ in the location field-strength map RM must be found so that a predetermined cost function between $p_{meas}$ and the field-strength vector ${}^k p_{RM}$ is minimized. This can be achieved in various ways, but pattern-matching algorithms are most suitable for the task set here, as $p_{meas}$ can be viewed as a pattern that has to be mapped onto a given model, represented by the location field-strength map RM.

In the embodiments described here, the pattern-matching algorithm uses a sequential pass through the search space in order to search for the particular position ${}^k pos_{RM}$ in the location field-strength map that minimizes the following cost function.

$$\Gamma(h) = \sum_{n=1}^{N} (p_{measn} - {}^h p_{RMn})^2 \quad (3)$$

Here, the index h stands for the $h^{th}$ position ${}^h pos_{RM}$ in the search space and n is the index of the base stations. $p_{meas\,n}$ is the $n^{th}$ element of the measured field-strength vector $p_{meas}$, and ${}^h p_{RM\,n}$ is the $n^{th}$ element of the field-strength vector ${}^h p_{RM}$, which originates from the location field-strength map RM.

The index H at which the cost function $\Gamma$ is minimal, i.e. H=arg min($\Gamma$), returns the nearest spatial position in the model (i.e. in the location field-strength map) for this pattern. The expression "nearest" relates directly to a distance measurement which is defined in the cost function. The equation (3) returns, for example, the square of the Euclidian distance in N-dimensional space. The value ${}^H pos_{RM}$ as the nearest match with the search pattern marks the "nearest-neighbor algorithm" (NN) just described. The above method is used in all the embodiments described below in order to determine the located position from the measured field-strength vector $p_{meas}$.

The method according to the invention is distinguished in that initially a location field-strength map determined with simple means can be employed for position-finding, the field-strength map being updated correspondingly during at least some of the position-finding steps in order to adapt it precisely to the prevailing surrounding area. The way in which the location field-strength map that exists initially can be determined in the embodiments described here will be described below. When initially determining the location field-strength map only the reciprocal measurements for each base station are used. With these few measurements, the initial model is not very accurate, but the model can be generated rapidly without a technician having to be deployed to measure the location field-strength map. The generation of the initial model in the embodiments described here consequently represents a kind of self-calibration of the localization system. The self-calibration is independent of the steps described further below for updating the location field-strength map.

To generate the initial location field-strength map, theoretical field-strength propagation models are used which usually define the field-strength value as a function of the distance and are characterized by the following equation:

$$p = p(d) = p_0 + \gamma \cdot f(d) \quad (4)$$

Here, p represents the power (the field strength) in a logarithmic representation, the field strength depending on the distance d and the fixed parameters of the output power $p_0$ and the loss factor $\gamma$. For the function f(d), 10·log(d) is usually used, as defined in the printed publication [1], a minimum distance $d_0$ having to be defined for use of the model in order to avoid singularities. The minimum distance presents a problem with wave propagation in buildings since there a receiver can be very near to a base station. Furthermore, the initial model for wave propagation in buildings constitutes a very marked approximation, so that even a simpler wave-propagation law than according to equation (4) does not generate greater errors, but leads more easily to an estimate from the few measurement values. A linear function f(d)=d has therefore been chosen in the embodiments below.

Based upon equation (4) above, two different models are used in the embodiments of the invention described here in order to establish the field-strength vectors at a plurality of support points in the location field-strength map during initialization of the method. In particular, the radial model and the DPM model (DPM=dominant path model) are considered, both models being adequately known from the prior art.

In the radial model, a radial symmetry is assumed, so that equation (4) is applied directly for each base station BS, which in turn means that the field strength received from a mobile object depends exclusively on the distance to the respective base station. During initialization, each base station BS measures the RSS value of the N−1 neighboring base stations such that the two parameters $p_0$ and $\gamma$ for each base station can be determined by means of the least squares method ("least squares fit").

The DPM model described below, which is known for example from printed publications [4] and [5], is based on an improvement of the MWM model (MWM=multi wall model) known from printed publication [1]. The MWM model uses a modified variant of equation (4), which also takes into account the walls through which the field-strength signal has to pass on the direct path between a transmitting base station and certain measuring points. The modified equation reads as follows:

$$p=p(d)=p_0+\gamma \cdot f(d)+\Sigma WAF \qquad (5)$$

Here, the expression WAF represents the wall attenuation factor, which is a parameter that depends on the thickness of the wall and the dielectric properties of the wall material. In general, each wall can have its own WAF factor. In a simple model, different wall types can be defined. By means of the summation defined in equation (5), propagation paths in which more than one wall is traversed can also be taken into account. In order to use the model characterized by equation (5), a description of the position and orientation of the walls and/or objects in the space must be available, for example in the form of a building plan which exists as an image in known graphic formats (e.g. jpeg, gif, etc.) or is made available by a CAD system.

The greatest disadvantage of the MWM method is that it considers only direct paths between receiver and transmitter. A direct path does not necessarily have to match the particular path on which the strongest field strength is received (so-called dominant path). Consequently, the result is often an estimation of an RSS value that is lower than the actual RSS value at the object position under consideration.

In order to resolve this problem, ray-tracing algorithms, adequately known from the prior art, compute all the possible paths between transmitter and receiver and summate the individual contributions of these paths, by which means a better estimation of the field strength is obtained than by the MWM method alone. However, the computation of all the paths requires a very large amount of computing time for each position. In particular, not only is the number of paths large but a high level of accuracy of the map under consideration is needed for the algorithm.

The DPM model lies between the two techniques of the MWM method and the ray-tracing algorithms. It uses information from the map of the surroundings to determine the dominant path that makes the greatest contribution to signal strength in the overall Signal. The DPM path can be longer than the MWM path and can also continue through walls. In the DPM method, only the dominant path is used in order to estimate the received field strength in an object position under consideration. The model is, furthermore, described by equation (5), but only the length of the dominant path and the corresponding walls on this path are considered. Better results are obtained by means of the DPM method than with the MWM method, and it has been shown that the results are almost as good as the results which are determined with the time-consuming ray-tracing algorithms.

Taking a simple building plan as an example, FIG. 1 shows how the methods described above differ from one another. Here, a corridor C and three rooms R1, R2 and R3 which are separated by corresponding walls are shown. Furthermore, a base station BS is represented as a transmitter and an object point Rx as a receiver. The dot-dash line shows the path which is used in the MWM method. This path goes through walls and is a direct path between BS and Rx. The dashed lines show the various possible signal propagation paths in the ray-tracing method. In the DPM method, the particular signal propagation path via which the greatest field-strength value arrives at point Rx is used for computing the field strength. This is the dominant path, which is reproduced in FIG. 1 as a solid line. It will be noticed that in the example shown in FIG. 1 this path crosses through just a single wall, namely the wall between the corridor C and the room R3.

In the DPM model, the dominant path can be computed with the aid of the following steps (see also printed publication [6]):

Step 1:

Generate a vector structure map. Define the room structure and the room index. Generate a symmetrical room connection matrix C1. If the room i and the room j share the same walls, set $C1(i,j)=1$, otherwise set $C1(i,j)=\infty$.

Step 2:

Detect the rooms in which the transmitter and the receiver are positioned, using the algorithm defined in the printed publication [7]. If the transmitter and the receiver are positioned in the same room, go directly to step 3 below. Otherwise search for the shortest room connection from the room with the transmitter to the room with the receiver in the matrix C1 with the aid of the Dijkstra algorithm known from the prior art (see printed publication [8]). The cost value for the shortest path is the number of walls penetrated.

Step 3:

Combine the room with the transmitter, the room with the receiver and the rooms in the shortest path by omitting the walls which the rooms share.

Step 4:

Detect convex corners in the room combined in this manner and generate a symmetrical connection matrix C2 between the transmitter, the receiver and the convex corners. If there is no object between the point i and the point j, $C2(i,j)$ corresponds to the distance between the point i and the point j. Otherwise, $C2(i,j)$ is set to $\infty$.

Step 5:

Find the shortest path between the transmitter and the receiver in the matrix C2 via the Dijkstra algorithm mentioned above. The cost value of the shortest path is given by the sum of the distances. This shortest path is called a curved path.

Step 6:

Use reciprocal field-strength measurements in order to estimate the parameters $p_0$, $\gamma$ and WAF in the DPM model with the aid of a least-square fit.

Step 7:

Calculate the loss on the direct path between transmitter and receiver and for the curved path which was obtained in step 5. If the loss on the curved path is lower than on the direct path, the curved path is used as the dominant path. Otherwise, the direct path is used as the dominant path.

Finally, the initial location field-strength map is obtained with the aid of the information from the geographical map and the DPM model. This is done by determining for each position in the location field-strength map the length of the dominant path, and from this the corresponding field strength at the respective position is then obtained by means of the formula (5). A discrete location field-strength map is then available in which for each support point the locational position and the corresponding field-strength vector are indicated.

The embodiments of the inventive method described here use a location field-strength map which has been generated in an arbitrary manner, whereby, in particular, one of the methods described above is used for generating such a location field-strength map. Here, the initial location field-strength map is only very rough and does not have the desired accuracy for localizing objects precisely. Therefore, according to the invention, an updating of the field-strength map is always carried out, e.g. just when the position of a mobile object is being located. In the embodiments described below, an online learning method is used in which new position-finding processes are used in order to modify the initial location field-strength map and thereby improve localization accuracy.

The learning method is a method which is based on Kohonen's self-organization map (see printed publication [2]). The updating is achieved by means of a correction term for the error, this correction term being called an "update surface". This update surface is added to the individual field-strength values of the location field-strength map, in order by this means to improve the accuracy of the field-strength values at the individual support points. The update surfaces are determined for each base station BSn and are based on the local error $\Delta p_n$, which is defined as:

$$\Delta p_n = p_{meas\ n} - p_{RM\ n}, \quad (6)$$

where $p_{meas\ n}$ is the measured field strength and $p_{RM\ n}$ the field strength which is predetermined by the location field-strength map, specifically e.g. the field strength at the particular map position which was determined by position-finding using the fingerprinting method. The center of the update surface is defined by a specific position in the location field-strength map, which is designated $^c pos=[^c x\ ^c y]$. The determination of $^c pos$ depends on the way in which the localization is carried out, as described in detail further below. The maximum value of these update surfaces is scaled by a factor $\kappa$, which is considered to be the learning rate, and the absolute value of the update surface decreases evenly in all directions and ultimately reaches zero. Consequently, the area of influence of the update surface is spatially limited by a surrounding area, which is referred to below as the adaption width or adw. The update surface is generally defined as:

$$S_{UPD} = \Delta p \cdot f(r), \quad (7)$$

In accordance with this definition, the update surface combines two important information sources, namely on the one hand the local error $\Delta p$ of the field-strength value and on the other the weighting factor $f(r)$ that reflects the relevance of the error as a function of the distance.

The distance or the radius $r$ between the central position $^c pos$ and any function $pos=[x\ y]$ is defined here as:

$$r = \sqrt{(x-^c x)^2 + (y-^c y)^2}, \quad (8)$$

The weighting factor is defined in the embodiment described here by a Gaussian surface as follows:

$$f(r) = \kappa \cdot e^{\frac{1}{2}\left(\frac{r}{\sigma}\right)^2}, \quad (9)$$

This weighting factor has already been described in document [2]. Since a Gaussian bell is at three times the standard deviation, i.e. at $3\sigma$, essentially zero from the center of the bell, the function as per equation (9) is, in a preferred embodiment of the invention described here, approximated by the following function:

$$f(r) = \begin{cases} \kappa \cdot (1 - r/adw), & \text{falls } r \leq adw \\ 0, & \text{falls } r > adw \end{cases} \quad (10)$$

According to this function, an adaption width adw is established which preferably lies at $3\sigma$. All function values outside this adaption width are set to zero. This means that field-strength values for positions having a distance greater than $3\sigma$ from the center of the Gaussian bell are not updated. Use is made here of the fact that a local error is of relevance only in a certain area surrounding the measuring point under consideration since, in the case of support points further away, additional effects can falsify the measurement.

During the learning method, in particular during generation of the update surface, there are two options for determining the local error, which is defined according to equation (6).

According to one variant, the central error is considered at which the measured field strength $p_{meas}=^c p$ is linked to the located position $pos_{RM}(^c p)$ in the field-strength map. Here, the located position is preferably determined by means of the fingerprinting method. This located position is used as the center of the update surface, i.e. $^c pos = pos_{RM}(^c p)$. The local error $^k \Delta p$ is calculated at each position $^k pos_{RM}$ in the location field-strength map for all base stations as follows:

$$^k \Delta p = ^c p - ^c p_{RM}, \quad (11)$$

where the measured field-strength vector $^c p$ defines the center $^c pos$. $^c p_{RM}$ is the field-strength vector at the located position in the location field-strength map determined in particular via the fingerprinting method. The index $k=\{1, 2, \ldots, K\}$ represents all positions $^k pos_{RM}$ which exist in the location field-strength map.

Where the central error is used, $^k \Delta p = \Delta p$ is constant for all $k$ and depends only on the choice of $^c pos$. The set of all $^k \Delta p$, for all K support points in the location field-strength map then generates update surfaces having constant values, more precisely one update surface for each base station respectively. The localization error $\Delta p$ consequently constitutes a vector with constant multipliers in equation (7).

By means of a small change to equation (11), the central error is converted into a neighborhood error, which is defined as follows:

$$^k \Delta p = ^c p - ^k p_{RM}, \quad (12)$$

where $^k \Delta p$ is now no longer constant in the space since $^c p$ is compared with a set of K field-strength values which originate from the location field-strength map. For reasons of efficiency, only the positions which lie in the region that is limited by the above adaption width adw are used here for calculating both the central and the neighborhood error.

In accordance with the method just described, an updating of the location field-strength map can be achieved by Gaussian functions whose center is given by a located position which was determined with the aid of the fingerprinting method described above. This is unsupervised learning, as the actual position of the object is not known at any time, rather the located position is always used as the center of the update surface.

In a further variant of the invention, the above method can, however, also be used for supervised learning, as will be described below.

A path-presetting method (also called PPS method) will be examined below. This method serves in particular in the calibration of a location field-strength map. A technician passes with the mobile object through the area of the location field-strength map, it being known during passage through the area at what positions the mobile object is located. The technician passes from one base station to the next and, in doing so, has to indicate which base station he starts from and which base station he arrives at. All position-finding measurements between the base stations take place on a defined path and at defined measuring points, a straight line with evenly spaced measuring points being considered for test purposes. In contrast to unsupervised learning, for each newly measured field-strength vector $^c p$ the position $^c pos$ is known directly as a position on the defined path. This known position is deployed as the center of the update surface used. Since the position $^c pos$ is based on information known in advance, this calibration method is called supervised learning.

The choice of paths which are executed by the mobile object during calibration is designed to take account of the requirement that as large an area of the location field-strength map as possible is covered. In particular, paths which extend over long distances return a better learnt dataset than paths which connect only closely neighboring base stations. The sequence of the paths executed therefore has a direct effect on the quality of the calibration. For N base stations BS, $(N^2-N)/2$ different direct connecting paths exist, and a preferred variant will be described below specifying in which order the mobile object should execute the paths in order to achieve good calibration.

First, the matrix $path_{(i,j)}$ will be defined, which comprises Q ordered collinear positions between the base stations BSi and BSj ($pos_{BSi}={}^1pos$, $pos_{BSj}={}^Qpos$). Each position $^q pos$ in the path $path_{(i,j)}$ (where q={1, 2, ..., Q}) also defines the position of the center of the update surfaces used, i.e. $^c pos={}^{cq}pos$. The path $path_{(i,j)}$ can be written as a vector as follows:

$$path_{(i,j)} = \begin{bmatrix} {}^1pos \\ {}^2pos \\ \vdots \\ {}^{Q-1}pos \\ {}^Q pos \end{bmatrix} = \begin{bmatrix} {}^{c1}pos \\ {}^{c2}pos \\ \vdots \\ {}^{cQ-1}pos \\ {}^{cQ}pos \end{bmatrix} \quad (13)$$

Here, each entry represents a two- or three-dimensional position of the measuring points on the path. As previously mentioned, the individual positions are evenly spaced so that the distance $\Delta path_{(i,j)}$ between consecutive positions in the $path_{(i,j)}$ can be calculated as follows:

$$\Delta path_{(i,j)} = \frac{1}{Q}\sqrt{[pos_{BSi} - pos_{BSj}][pos_{BSi} - pos_{BSj}]^T} \quad (14)$$

In order to achieve good coverage of the location field-strength map by paths executed, a so-called path-cost function is examined, in which firstly the distance from each position $^q pos$ assumed on a path to the next base station is examined. This distance is designated $^q d_{BS}$ and reads as follows:

$$^q d_{BS} = \min_{n=1}^{N}\left(\sqrt{[pos_{BSn} - {}^q pos][pos_{BSn} - {}^q pos]^T}\right) \quad (15)$$

With the aid of this function, a cost value $\Gamma_{path}$ for a path is computed whereby the maximum is selected from all the distances as per equation (15) for a path between the base stations i and j. This gives rise to the following cost function:

$$\Gamma_{path}(i,j) = \max_{q=1}^{Q}({}^q d_{BS}) \quad (16)$$

This path-cost function reflects how far removed the area through which the path runs is from base stations. In order to achieve good calibration, according to the variant of the inventive method described here, paths with high path costs are run through at first. In other words, the paths are run through by the mobile object in decreasing order of their cost. It should be noted here that the selection of the paths can itself be affected by certain restrictions, for example by the fact that positions which have already been assumed previously are dynamically taken into account in the computation of new path costs.

Each path can now be viewed as a set of measuring points, each of these measuring points being linked to a local error as per equation (6) described above. For this reason, in the embodiment described here, a path is viewed as a whole and adapted block-wise, whereas in the embodiment described previously an adaptation of the location field-strength map can be carried out in a measuring point after each position-finding process. In the embodiment being described now, however, all the positions which are associated with a path under consideration are taken into account when computing the update surface. Consequently, the update always takes place only after the traversing of a path by the mobile object.

In the variant described here, the Gaussian area is again used as weighting of the local error as per equation (9). This area is based on the central error which is given by equation (11). In order to take into account simultaneously all the positions on a path between the base stations BSi and BSj, some modifications have been made in the composition of the update surface.

The first modification is that the standard deviation $\sigma$ has been made proportional to the even spacing between the positions on the path, i.e. proportional to $\Delta path_{(i,j)}$. Consequently, $\sigma=\phi \cdot \Delta path_{(i,j)}$ applies. This means that each path has its own standard deviation $\sigma$ for a fixed $\phi$, provided that $\Delta path_{(i,j)}$ is different for each path.

The sequence of the positions along the path generates a sequence of Gaussian bells for each position on the path, the Gaussian bells overlapping one another. A type of normalization should therefore be used in order to achieve the outcome whereby the sum of all the Gaussian bells along the path lies within the limits of the original local error values on the update surface. The normalization used here is based on so-called "partitioning-to-one-normalization", which is used in radial networks (see printed publication [3]).

By analogy with equation (8), the radius r for the central position $^c pos$ and for the $q^{th}$ position $^{cq}pos$ on a path is defined as $^q r$ as follows:

$$^q r = \sqrt{(x - {}^{cq}x)^2 + (y - {}^{cq}y)^2} \quad (17)$$

Accordingly, the local error defined in equation (11) is modified for a sequence of path positions $^{cq}pos$ as follows:

$$^{kq}\Delta p = {}^q\Delta p = {}^{cq}p - {}^{cq}p_{RM}. \quad (18)$$

Using $^q r$ and $^q \Delta p$ in equation (7) or (9) yields in the following term as normalized update surface for the $q^{th}$ path position $^q pos$ and for the base station n:

$$S_{UPD}(r,q) = \kappa^q \Delta p_n \frac{e^{-\frac{1}{2}\left(\frac{q_r}{\sigma}\right)^2}}{\sum_{g=1}^{Q} e^{-\frac{1}{2}\left(\frac{g_r}{\sigma}\right)^2} + \zeta} \qquad (19)$$

Here, $\zeta$ is a positive term so as to ensure that the denominator never becomes zero, which means that the normalized Gaussian surfaces also actually decrease to zero at positions at a large distance from the center. It must be taken into account here in particular that the choice of $\zeta$ also introduces deformations in the surface. If $\zeta$ is too large, the surface rescales to smaller values. If $\zeta$ is too small, the surface assumes rectangular shapes instead of a bell, even though the surface is normalized to one. It has been shown that a preferred value for $\zeta$ lies at 0.3.

The essential difference between the calibration just described using the PPS method and calibration using unsupervised learning is that, in the case of unsupervised learning, for each new measurement of the field-strength value $^c p$ the position $^c pos$ is derived exclusively from the model used in position-finding, in particular by means of the fingerprinting method. This means that the positions estimated by means of the originally used location field-strength map are used in order to update the model (i.e. the location field-strength map), and this is done without the actual position of the object being known.

A further important difference between unsupervised and supervised learning is that, in the case of unsupervised learning, the measurements can be undertaken at any location in the location field-strength map and are not restricted only to direct paths between two base stations, as is the case with the PPS method. Consequently, with learning more points can be taken into account.

A further difference is that, in the case of unsupervised learning, updating of the location field-strength map is carried out with each new measurement, whereas updating in the PPS method cannot be carried out until a path has been executed.

Experimental results are presented below which are based on experiments conducted by the inventors, by means of which experiments objects were localized using previously described variants of the inventive method.

The method according to the invention was tested for different surroundings in office buildings. As an initial model, both the radial model and the DPM model were used for each surrounding area and both for the supervised learning method and for the unsupervised learning method.

To determine the localization error, the entire measurement was examined. The mean error in the position estimation was calculated. The error itself is the distance between the estimated position and the actual position at which the measurement was carried out. Each position was measured three times and the average formed from these measurements.

For the supervised learning, a location field-strength map based on a regularly spaced grid was used, each support point being offset from the other by one meter. The actual measuring positions were not exactly collinear with the direct paths between the base stations. However, the positions were chosen such that they lay as close as possible to the direct path. It could thus be assumed that $\Delta path_{(i,j)}$ was constant for each path. The localization error was always calculated when a single path between two base stations was executed by the mobile object. In the diagrams explained further below, the number of the path is consequently reproduced on the X axis.

For the unsupervised learning, the support points of the location field-strength map were formed by the actual measuring positions. The localization error was calculated with each new measurement. The measurements were chosen randomly from a set of measurements, repeated measurements being permitted without restriction. The control parameters $\kappa$ and $\phi$ were varied both for the supervised and for the unsupervised learning.

Figure 2:
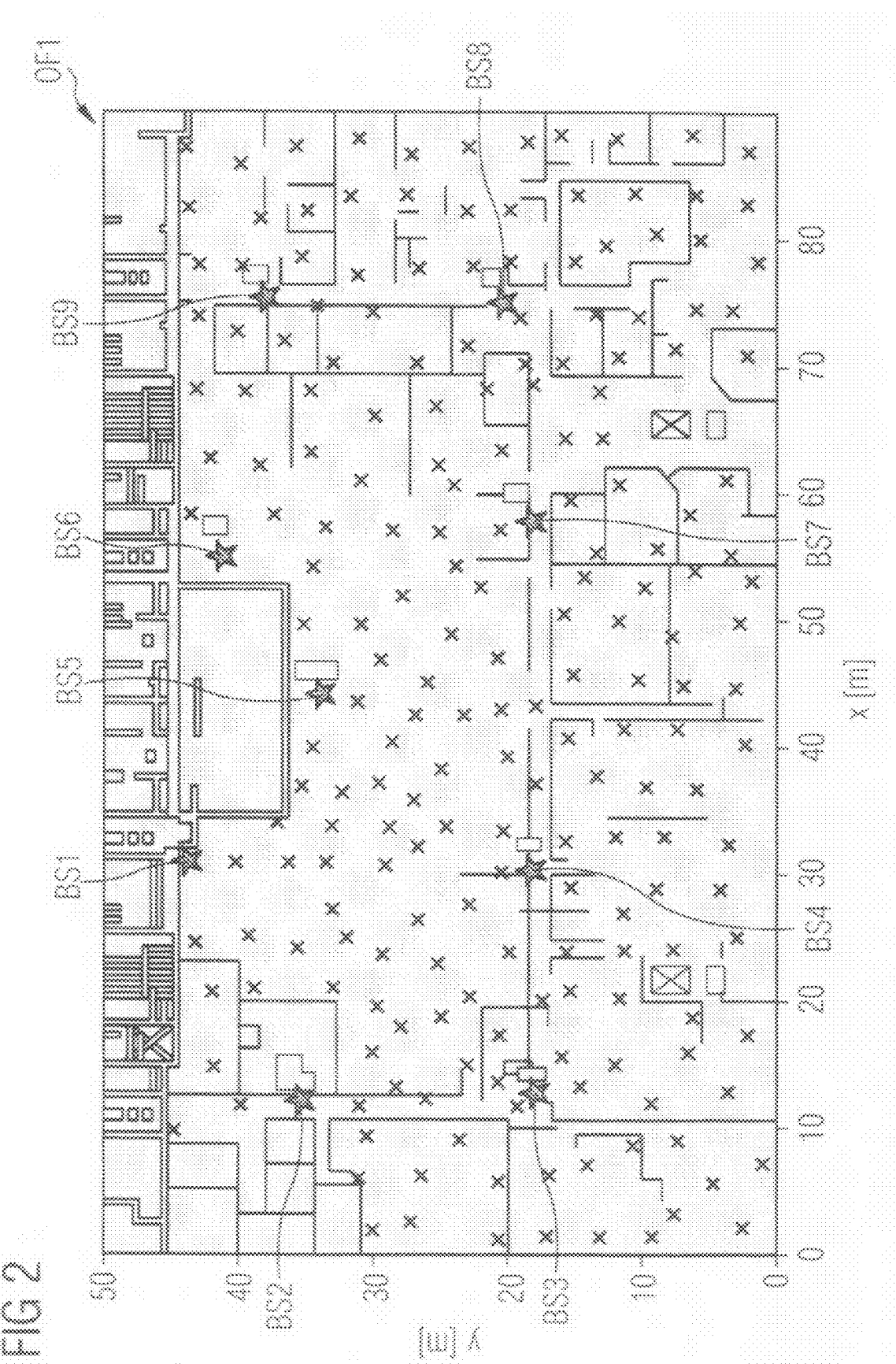
FIG. 2 shows a representation of a first building environment in which the method according to the invention was tested.

FIG. 2 shows the plan of a first building OF1 in which the method according to the invention was carried out. Nine base stations BS1, BS2, ..., BS9, which are indicated by stars, are installed in the building. Measurements were carried out in the building at a total of 223 different measuring points, these measuring points being indicated in FIG. 1 as crosses. The base stations are DECT standard-compliant transceivers. For the PPS method, a combination of all the possible paths between the base stations yields 36 different paths. If only the measuring points along the paths are considered, the measurement consists only of 88 different measuring points. The order of the paths executed was found via equation (16) above. For the first 10 paths with numbers 1 to 10, the following base stations were connected to one another:

Path no. 1: from base station BS8 to base station BS3
Path no. 2: from base station BS3 to base station BS1
Path no. 3: from base station BS1 to base station BS8
Path no. 4: from base station BS8 to base station BS2
Path no. 5: from base station BS2 to base station BS9
Path no. 6: from base station BS9 to base station BS8
Path no. 7: from base station BS8 to base station BS6
Path no. 8: from base station BS6 to base station BS3
Path no. 9: from base station BS3 to base station BS2
Path no. 10: from base station BS2 to base station BS1

Figure 3:
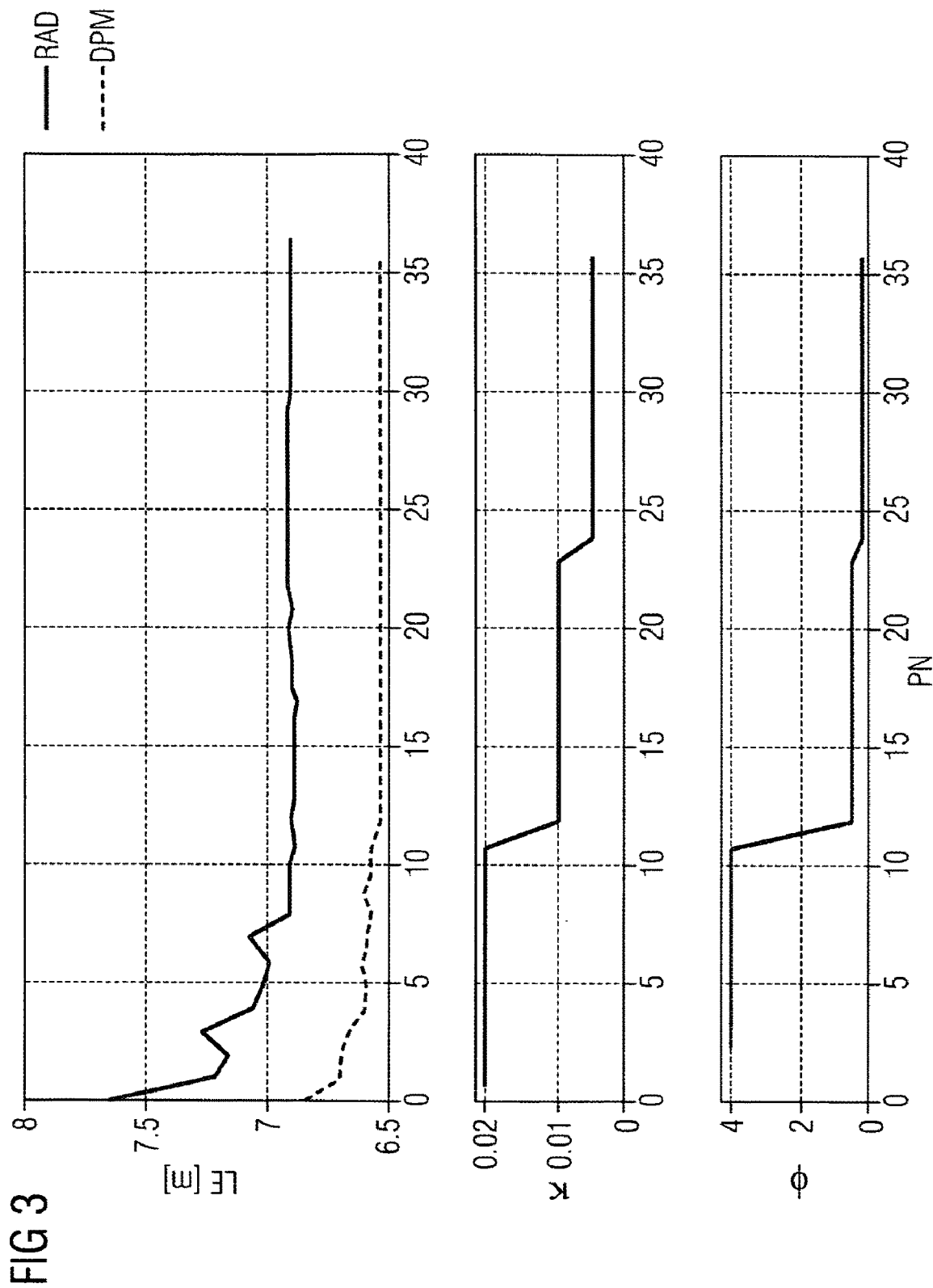
FIGS. 3 to 5 show diagrams which show the results of the tests of the inventive method in the first building environment.

FIG. 3 shows diagrams which reproduce the localization error LE and the parameters $\kappa$ and $\phi$ for the PPS method depending on the number of the path PN for the building OF1. In accordance with the algorithm described in the printed publication [2], the control parameters $\kappa$ and $\phi$ were chosen such that they diminish over time. According to FIG. 3, the localization error was compared both for the radial propagation model RAD and for the DPM model DPM as initial models. It will be recognized that the method returns smaller localization errors LE if the initial location field-strength map was computed by means of the DPM model. For both models, the localization error LE became increasingly small as the number of paths executed increased.

Figure 4:
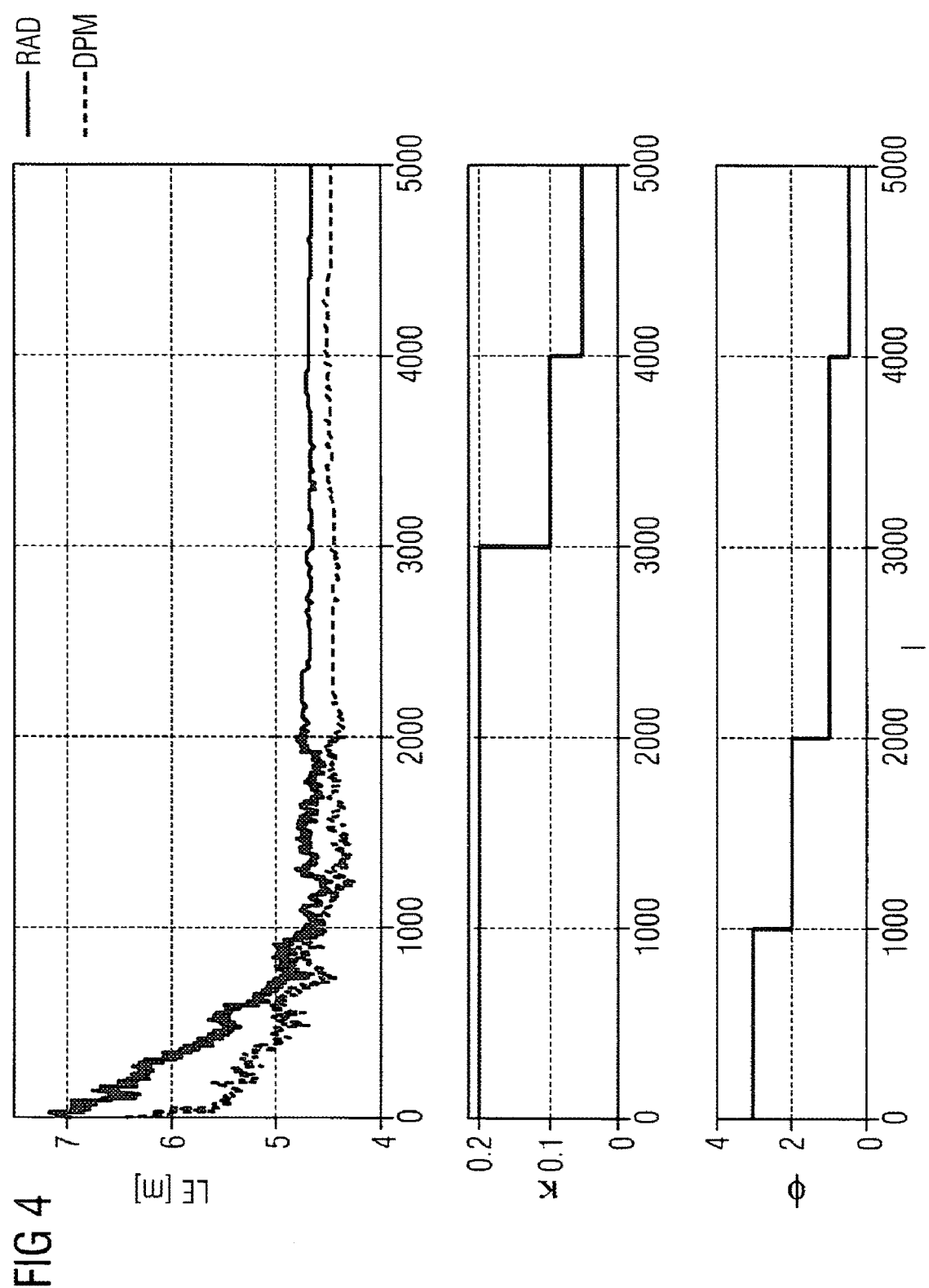
Figure 5:
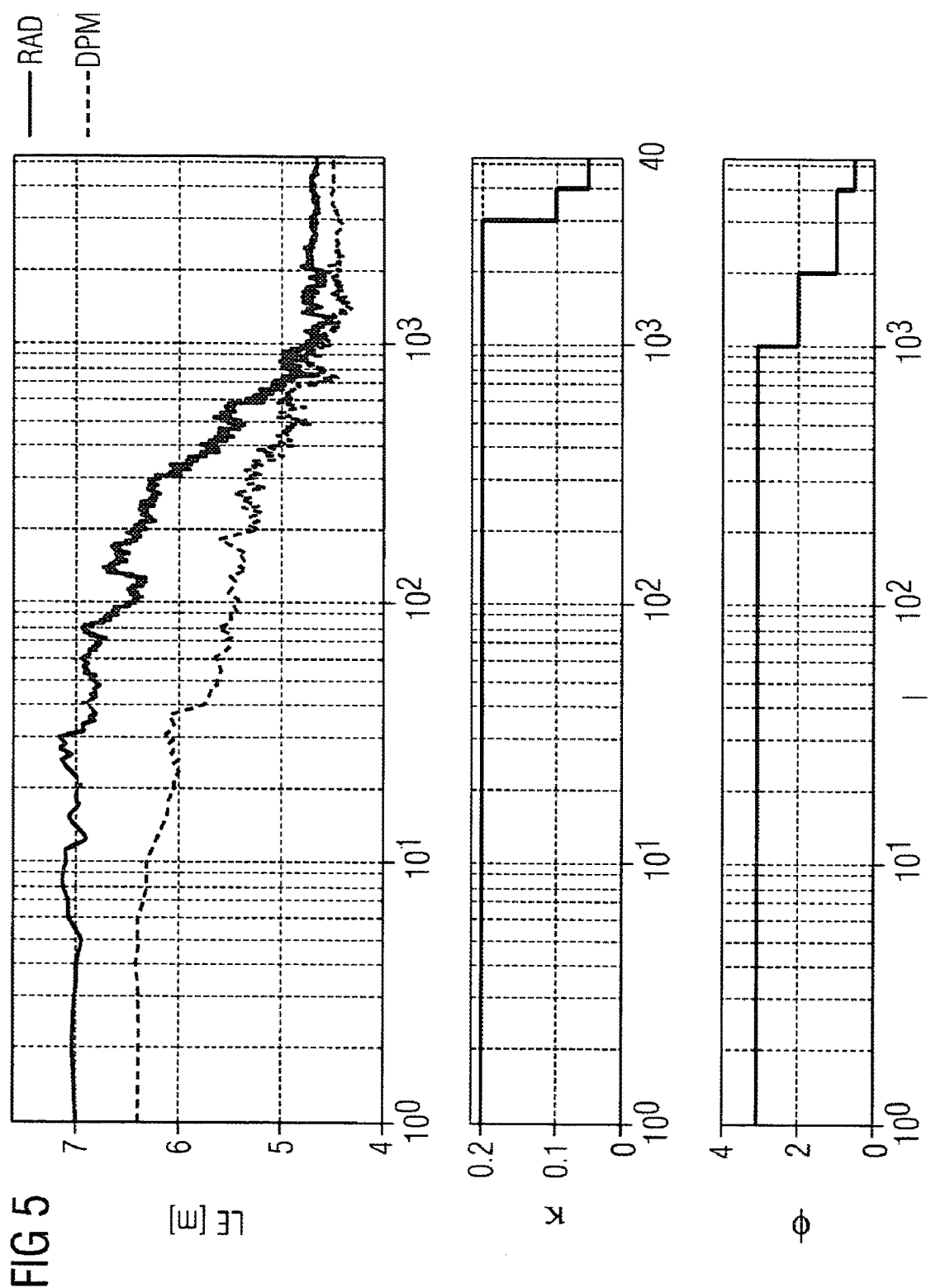

FIG. 4 shows a representation analogous to that of FIG. 3, in which the unsupervised learning method was used for learning for the building OF1. Here, all 223 measuring positions were used for learning and the learning process was carried out for 5,000 randomly selected measuring points. In contrast to FIG. 3, the individual iterations I, i.e. the individual measurements at the measuring points, are now reproduced along the X axis. Again, cases were compared in which, as original location field-strength map, a map according to the radial model RAD or a map according to the DPM model DPM was computed. FIG. 5 shows the same results as FIG. 4, but the iterations are reproduced on a logarithmic scale, so that the trend for the first 1000 iterations can be better seen. It will be recognized that the localization error decreases as the number of measurements increases. The learning is particularly fast at the start when the location field-strength map generated by means of the model is not yet so good. Toward the end, the learning becomes slower and the accuracy reaches the maximum possible accuracy. Maximum accuracy is given by the accuracy of the fingerprinting method used, by means of which the position is measured. In the fingerprinting method, the points at which the algorithm was learned unsupervised are used as reference points with known positions. The localization error of the fingerprinting method is limited at the bottom end, namely by the measurement noise of the field-strength measurements (due to signal shadowing, the noise of the measuring device and other environmental factors) and due to the density of reference points and the number of base stations and other effects. The maximum possible accuracy for the building OF1 lies at 4.6 meters.

Figure 6:
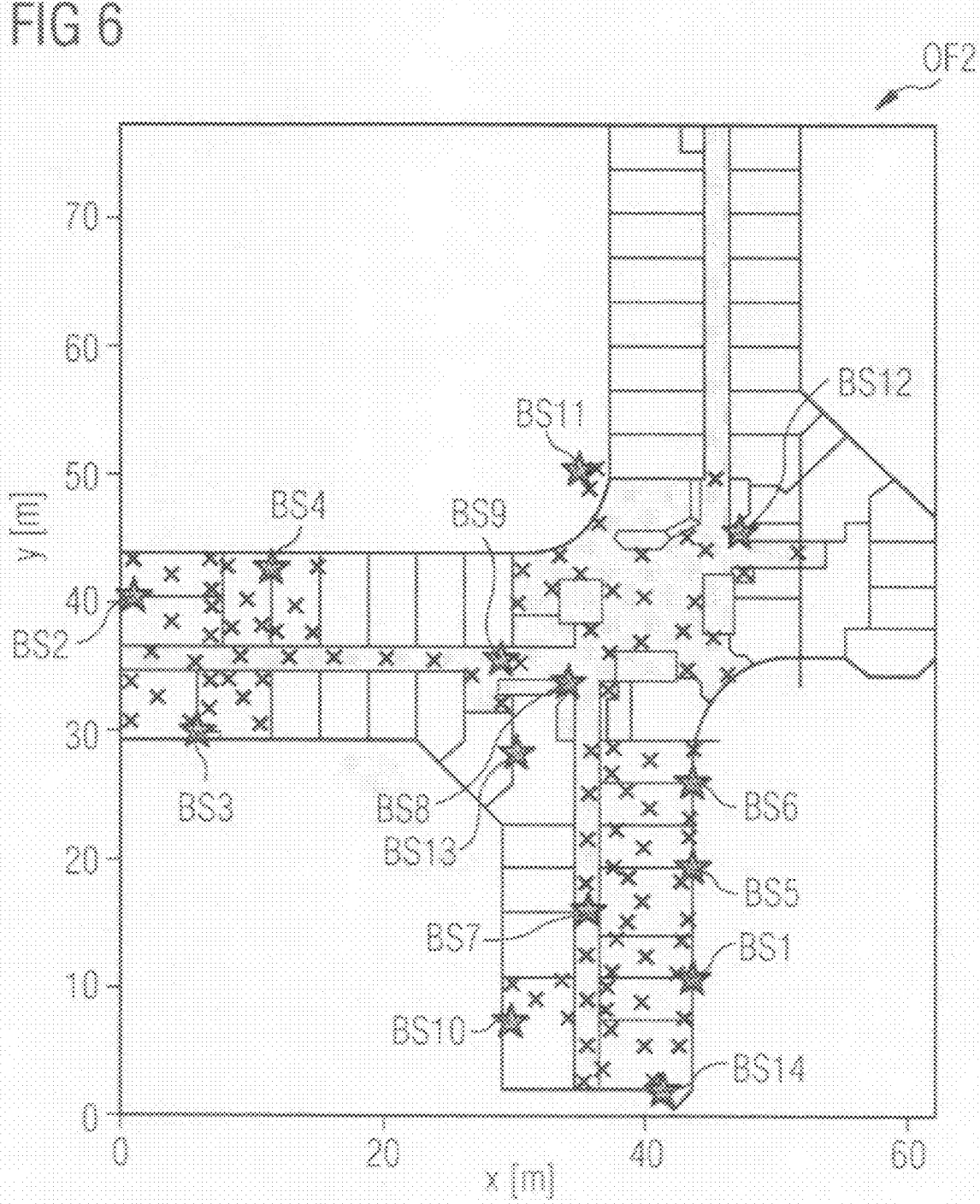
FIG. 6 shows a second building environment in which the method according to the invention was tested.

FIG. 6 shows the plan of a second building OF2, for which the method according to the invention was likewise tested. 14 WLAN base stations BS1, BS2, ..., BS14 are installed in this building. The base stations are again reproduced as stars. The complete set of measurements contains 114 different measuring points, which are represented as crosses. Again, the supervised PPS learning method was implemented. For this method, a combination of all possible paths between all the base stations yields a total of 91 paths. The order of the paths executed was again computed with the aid of equation (16) above, the concave shape of the building also being taken into account. This means that paths which pass beyond the limits of the building were not taken into account, for example the path from base station BS3 to base station BS10. For the first ten path numbers 1 to 10, the following connections from base stations were used:

Path no. 1: from base station BS2 to base station BS9
Path no. 2: from base station BS9 to base station BS12
Path no. 3: from base station BS12 to base station BS8
Path no. 4: from base station BS8 to base station BS7
Path no. 5: from base station BS7 to base station BS14
Path no. 6: from base station BS14 to base station BS12
Path no. 7: from base station BS12 to base station BS13
Path no. 8: from base station BS13 to base station BS5
Path no. 9: from base station BS5 to base station BS11
Path no. 10: from base station BS11 to base station BS3.

Figure 7:
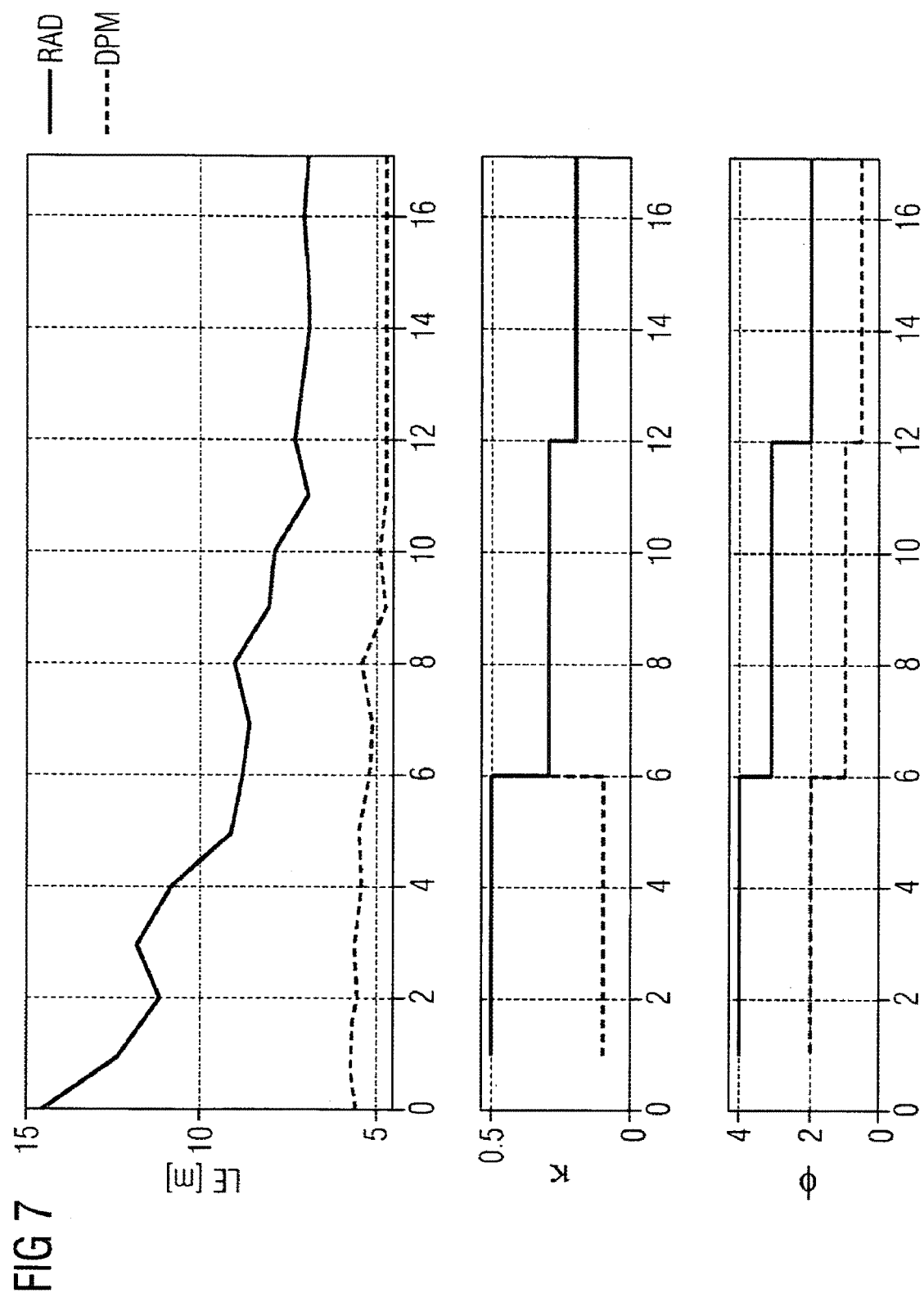
FIGS. 7 to 9 show diagrams which show the results of the tests of the inventive method in the second building environment.

FIG. 7 shows again the localization error LE and the model parameters $\kappa$ and $\phi$ depending on the path number PN. The case of an original location field-strength map with the radial model RAD and the case of an original location field-strength map with the DPM model DPM were considered. Here the localization error is reproduced for the first 17 paths, which comprise 50 different positions from the original set of measurements. Analogously to FIG. 3, the control parameters $\kappa$ and $\phi$ decrease over time.

Figure 8:
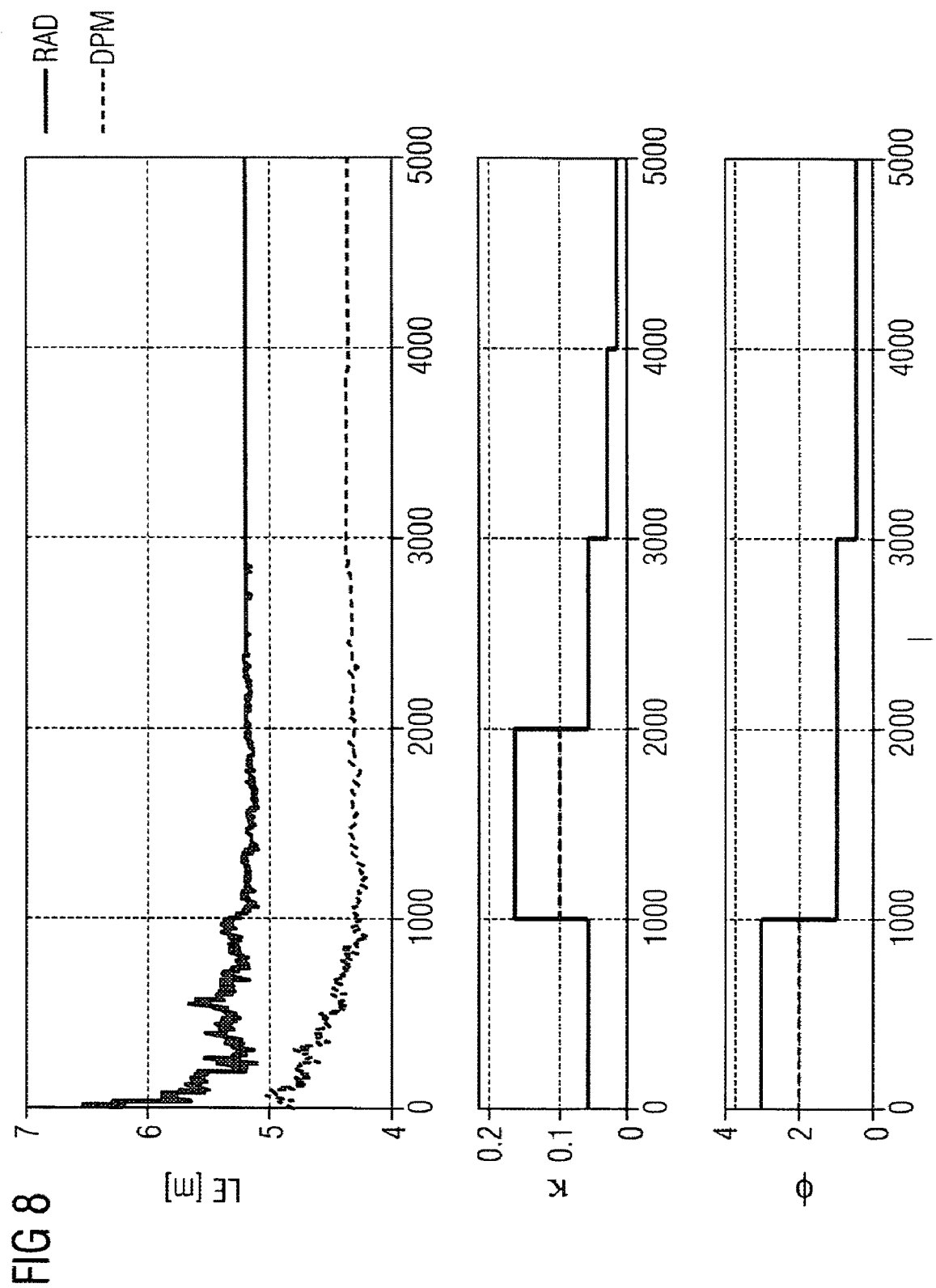
Figure 9:
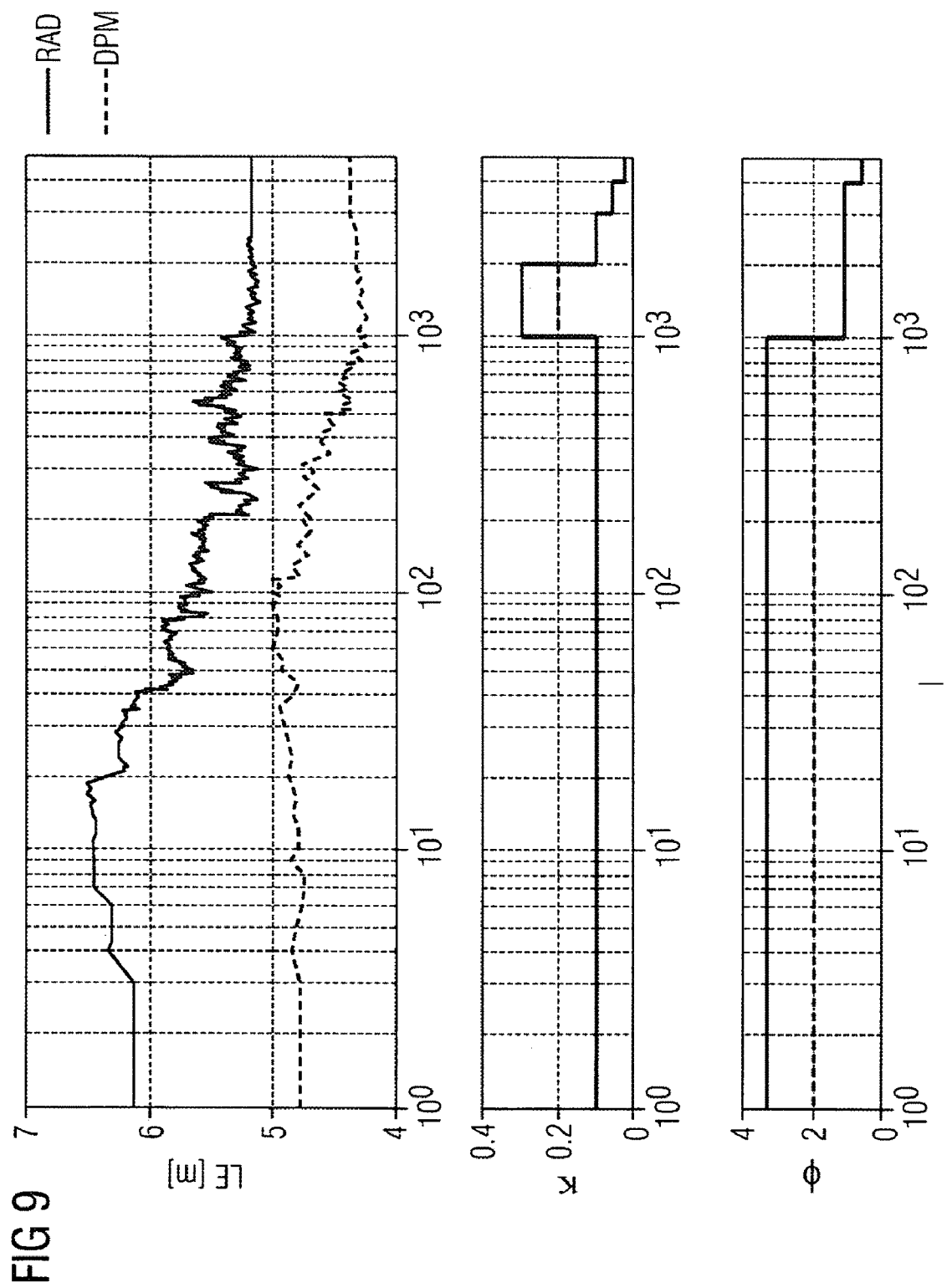

FIG. 8 shows the result for unsupervised learning, all 114 measuring positions being included. The learning method was implemented using 5000 randomly selected measuring points. FIG. 8 shows the results on a linear scale of the X axis and FIG. 9 shows the same results on a logarithmic Scale of the X axis. It will be recognized that the use of an original location field-strength map according to the DPM model returns significantly better results, as in this model additional information relating to the layout of the surrounding area, in particular the positions of the walls, is taken into account. The building environment OF2 is characterized here in particular in that the walls are coated with metal foil, which greatly attenuates the signals. Accordingly, the information about the walls provides a very good starting model, which results in a low localization error even before the start of the learning method. The learning consequently beings no substantial improvement in the original localization error. By comparison, the method using the radial model starts with an initially very poor localization error, which then, however, improves significantly during learning.

As is evident from the preceding comments, a very good level of localization accuracy is achieved by means of the localization method according to the invention, the installation and maintenance costs for the method being very low. In particular, no initial calibration of the method with the aid of reference measurements is required, as the calibration is carried out by updating the location field-strength map during the method itself. The method starts here with an initial wave propagation model of low complexity, the parameters of which have been determined through a small number of measurements, for example through self-measurement by the base stations. It will be recognized that, where the DPM model is used, the accuracy of the method is better than where the simple radial model is used. The original location field-strength maps are according to the invention adapted online during the learning method, a distinction being made between an unsupervised learning method and a supervised learning method. In the unsupervised learning method, the localization and the updating of the location field-strength map are carried out simultaneously. In the supervised learning method, by contrast, a known path is predetermined on which the mobile object moves. The accuracy achieved by means of the method is comparable with localization algorithms which use reference measurements; however, it is not necessary in the case of the method according to the invention to carry out such reference measurements before the start of the method.

BIBLIOGRAPHY

[1] T. S. Rappaport, Wireless Communications Principles and Practice, $2^{nd}$ Ed., Prentice Hall Inc., 2002.
[2] T. Kohonen, "The self-organizing map," *Proceedings of the IEEE*, vol. 78, no. 9, pp. 1464-1480, September 1990.
[3] M. Schlang, M. Haft and K. A. Fuchs, "A comparison of RBF and MLP networks for reconstruction of focal events from bioelectric/biomagnetic field patterns," in *Mustererkennung* 1994 *Erkennen and Lernen,* 16th DAGM Symposium and 18th Workshop of the ÖAGM, 1994.
[4] G. Wölfle, R. Wahl, P. Wertz, P. Wildbolz and F. Landstorfer, "Dominant path prediction model for indoor scenarios", *German Microwave Conference (GeMIC)* 2005, April 2005.
[5] G. Wölfle, and F. Landstorfer, "Dominant paths for the field strength prediction," $48^{th}$ *IEEE Vehicular Technology Conference (VTC)* 1998, pp. 552-556, May 1998.
[6] H. Wang, *Fusion of Information Sources for Indoor Positioning with Field Strength Measurements*, Masters Thesis, TU-Munich, 2005.
[7] M. Shimrat, "Algorithm 112: position of point relative to polygon," *Communications of the ACM*, vol. 5, no. 8, pp. 434, August 1962.
[8] Robert W. Floyd, "Algorithm 97: shortest path," *Communications of the ACM*, vol. 5, no. 6, pp. 345, 1962.

The invention claimed is:

1. A method for a computer-aided localization of a mobile object aided by a feature-based position-finding method where features of a plurality of base stations are measured, and a position of the object is located from the features using a reference map, the feature of a base station characterizing a field emitted by the base station at the object or a field emitted by the object at the base station, comprising:

predetermining, during initialization of the method, a reference map by calculating the reference map using a wave propagation model, the reference map comprising a multiplicity of support points, which are each represented by a position and a feature-dependent value assigned to the position;

carrying-out a plurality of position-finding processes during use of the method wherein a measured feature-dependent value and from the measured feature-dependent value a located position of the object are determined via the feature-based position-finding method using the predetermined reference map calculated using the wave propagation model; and carrying-out, in each case, for at least some of locations, an update of the predetermined reference map where the feature-dependent values are each corrected by a correction term at the support points of the reference map in a predetermined area surrounding an object position, the correction term depending on a difference between the measured feature-dependent value for the respective location and the feature-dependent value at a support point in the predetermined surrounding area; and wherein the features of the plurality of base stations are radio signal strengths of the base stations and the radio signal strengths are measured by the base stations such that each of the base stations self measures the radio signal strength of that base station and wherein the self measurements are the only source of measurements used to determine the reference map during the initialization of the method, the reference map being a field-strength map.

2. The method as claimed in claim 1, wherein the object position is previously known or is a position located via the respective position-finding process.

3. The method as claimed in claim 2, wherein the step of up-dating the predetermined reference map is carried out at a time of the respective position-finding process or after a predetermined number of position-finding processes has been carried out.

4. The method of claim 1 wherein the correction term depends on a Gaussian function and the predetermined area surrounding the object position depends on a standard deviation of the Gaussian function.

5. The method of claim 3 wherein the wave propagation model is a multi wall model propagation model, a dominant path model propagation model, or a radial propagation model.

6. The method of claim 4 wherein the predetermined surrounding area being formed by a shape being formed about a center of the Gaussian function that has a width or radius greater than or equal to the standard deviation and wherein the standard deviation of the Gaussian function depends on spacing between the support points on the reference map.

7. The method of claim 1 wherein parameters of the wave propagation model are determined at least partially by a self-measurement by the base stations.

8. The method as claimed in claim 7, wherein each of the plurality of position-finding processes is carried out with the aid of a fingerprinting method and/or with the aid of a probabilistic method.

9. The method as claimed in claim 8, wherein a size of the correction term decreases in magnitude with increasing distance from the object position.

10. The method as claimed in claim 9, wherein the correction term depends on a Gaussian function with a center of the function being the object position.

11. The method as claimed in claim 10, wherein the predetermined area surrounding the object position depends on a standard deviation of the Gaussian function.

12. The method as claimed in claim 11, wherein the predetermined surrounding area is formed by a circle about the center of the Gaussian function having a radius which is greater than or equal to the standard deviation.

13. A method for a computer-aided localization of a mobile object aided by a feature-based position-finding method where features of a plurality of base stations are measured, and a position of the object is located from the features using a reference map, the feature of a base station characterizing a field emitted by the base station at the object or a field emitted by the object at the base station, comprising:

predetermining, during initialization of the method, a reference map comprising a multiplicity of support points, which are each represented by a position and a feature-dependent value assigned to the position;

carrying-out a plurality of position-finding processes during use of the method wherein a measured feature-dependent value and from the measured feature-dependent value a located position of the object are determined via the feature-based position-finding method using the predetermined reference map; and carrying-out, in each case, for at least some locations, an update of the predetermined reference map where the feature-dependent values are each corrected by a correction term at the support points of the reference map in a predetermined area surrounding an object position, the correction term depending on a difference between the measured feature-dependent value for a respective location and the feature-dependent value at a support point in the predetermined surrounding area; and wherein the object position is previously known or is the position located via the respective position-finding process;

wherein the step of up-dating the predetermined reference map is carried out at the time of the respective position-finding process or after a predetermined number of position-finding processes has been carried out;

wherein the predetermined reference map is computed via a wave propagation model;

wherein the wave propagation model is an multi wall model propagation model or a dominant path model propagation model;

wherein parameters of the propagation model are determined at least partially by a self-measurement by the base stations;

wherein each of the plurality of position-finding processes is carried out with the aid of a fingerprinting method and/or with the aid of a probabilistic method;

wherein a size of the correction term decreases in magnitude with increasing distance from the object position;

wherein the correction term depends on a Gaussian function with a center of the Gaussian function being in the object position;

wherein the predetermined area surrounding the object position depends on a standard deviation of the Gaussian function;

wherein the predetermined surrounding area is formed by a circle about the center of the Gaussian function having a radius which is greater than or equal to the standard deviation; and wherein the standard deviation of the Gaussian function depends on a spacing of the support points on the reference map and lies between the support-point spacing and five times the support-point spacing.

14. The method as claimed in claim 13, wherein the Gaussian function is approximated by a function that decreases to zero with increasing distance from the center.

15. The method as claimed in claim 14, wherein the measured feature-dependent value is a field-strength vector, measured at the object or at the base stations at a time of the position-finding process and where the predetermined reference map is a location feature map in which the feature-dependent values are feature vectors for the positions of the support points, a feature vector comprising as entries the features of the base stations for a corresponding position.

16. The method as claimed in claim 15, wherein the correction term SUPD for a support point k inside the predetermined surrounding area is given by the following function or depends on the following function:

$$S_{UPD} = {}^k\Delta p \cdot f(r)$$

where f(r) is a Gaussian Function defined as follows:

$$f(r) = \kappa \cdot e^{-\frac{1}{2}\left(\frac{r}{\sigma}\right)^2}$$

where σ is the standard deviation and r is a distance from the object position and κ is a value less than 1, where kΔρ is a differential feature vector comprising one entry in each case for the feature of a base station from N base stations, where the differential feature vector kΔρ is either defined as:

$$k\Delta p = cp - cpRM,$$

where cp is the measured feature vector at a time of the position-finding process and cpRM is a feature vector determined at a located position by means of the location feature map (RM), or is defined as:

$$k\Delta p = cp - kpRM,$$

where cp is the measured feature vector at the time of the position-finding process and kpRM is the feature vector at the support point k of the location field-strength map.

17. The method as claimed in claim 16, wherein a path of the mobile object is predetermined and the object position at a time of a respective position-finding process is a previously known position.

18. The method as claimed in claim 17, wherein the object moves on one or more predetermined path sections between, in each case, two base stations, and object positions on the respective path section Q being known in advance and a position-finding process being carried out at each of these object positions.

19. The method as claimed in claim 18, wherein, at object position q (q=1, . . . , Q) of the Q object positions on a path section, the correction term SUPD(r,q) is defined as follows:

$$S_{UPD}(r, q) = \kappa^q \Delta p \frac{e^{-\frac{1}{2}\left(\frac{q_r}{\sigma}\right)^2}}{\sum_{g=1}^{Q} e^{-\frac{1}{2}\left(\frac{g_r}{\sigma}\right)^2} + \zeta}$$

where σ is the standard deviation and qr the distance from the objection position q and gr the distance from the object position g and where κ is a value less than or equal to 0.5, where ζ is a positive term which ensures that the denominator does not become zero, where ζ is preferably less than 1 and is, in particular, 0.3, where qΔp is a differential feature vector comprising one entry in each case for a feature of one base station of N base stations, where the differential feature vector qΔp is defined as:

$$q\Delta p = cqp - cqpRM,$$

where cqp is the measured feature vector at a time of the position-finding process at the object position q and cqpRM is a feature vector determined by means of the location feature map (RM) at the located position.

20. The method as claimed in claim 19, wherein a distance between consecutive object positions on a predetermined path section is constant and the standard deviation depends on the constant distance and is directly proportional to the constant distance.

* * * * *